United States Patent
Liu et al.

(10) Patent No.: US 7,430,224 B2
(45) Date of Patent: Sep. 30, 2008

(54) AUTOMATIC DISPERSION COMPENSATION IN AMPLIFICATION FOR SHORT PULSE FIBER LASER SYSTEM

(75) Inventors: Jian Liu, Sunnyvale, CA (US); Jiangfan Xia, Santa Clara, CA (US)

(73) Assignee: PolarOnyx, Inc., Sunnyvale, CA (US)

( * ) Notice: Subject to any disclaimer, the term of this patent is extended or adjusted under 35 U.S.C. 154(b) by 0 days.

(21) Appl. No.: 11/512,898

(22) Filed: Aug. 29, 2006

(65) Prior Publication Data
US 2007/0047598 A1 Mar. 1, 2007

Related U.S. Application Data

(60) Provisional application No. 60/714,570, filed on Sep. 7, 2005, provisional application No. 60/714,468, filed on Sep. 1, 2005, provisional application No. 60/713,654, filed on Aug. 29, 2005, provisional application No. 60/713,653, filed on Aug. 29, 2005, provisional application No. 60/713,650, filed on Aug. 29, 2005.

(51) Int. Cl.
*H01S 3/30* (2006.01)

(52) U.S. Cl. .............. 372/6; 372/18; 372/700

(58) Field of Classification Search ............ 372/6, 372/25, 30
See application file for complete search history.

(56) References Cited

U.S. PATENT DOCUMENTS

| | | | | |
|---|---|---|---|---|
| 2002/0122644 A1* | 9/2002 | Birks et al. | ............ | 385/125 |
| 2004/0247272 A1* | 12/2004 | Dawson et al. | ............ | 385/127 |
| 2005/0041702 A1* | 2/2005 | Fermann et al. | ............ | 372/25 |
| 2005/0105865 A1* | 5/2005 | Fermann et al. | ............ | 385/122 |
| 2006/0210275 A1* | 9/2006 | Vaissie et al. | ............ | 398/84 |
| 2006/0263024 A1* | 11/2006 | Dong et al. | ............ | 385/125 |

OTHER PUBLICATIONS

Limpert, All fiber chirped-pulse amplification system based on ccompression in air-guiding photonic bandgap fiber, Dec. 1, 2003, vol. 11, No. 24, 3332.*
Ouzounov, Generation of Megawatt Optical Soliton in Hollow-Core Photonic Band-Gap Fibers, Sep. 19, 2003; Science3, vol. 301, 1702.*

* cited by examiner

*Primary Examiner*—Dung T Nguyen
(74) *Attorney, Agent, or Firm*—Xin Wen

(57) ABSTRACT

A fiber Chirped Pulse Amplification (CPA) laser system includes a fiber mode-locking oscillator for generating a laser for projecting to a fiber stretcher for stretching a pulse width of the laser wherein the stretcher further comprising a Photonic Bandgap (PBG) fiber having a lower nonlinearity and an abnormal dispersion than a solid core fiber for connecting and transmitting a laser from the stretcher to a multistage amplifier for amplifying the laser into an output laser whereby a separate compressor is not required.

22 Claims, 2 Drawing Sheets

Automatic dispersion compensation in fiber amplifier

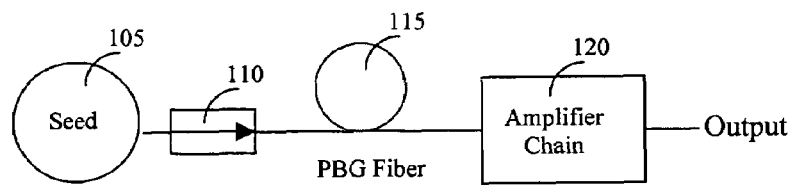
Figure 1 Automatic dispersion compensation in fiber amplifier
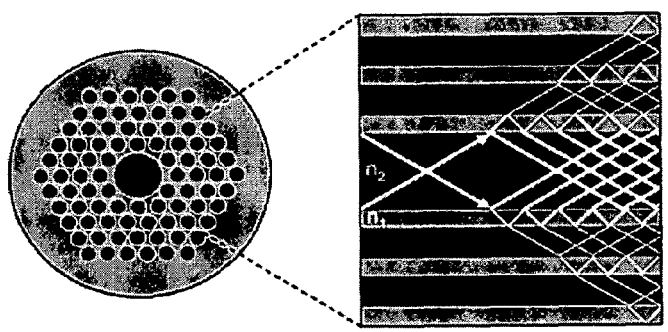
Figure 2A
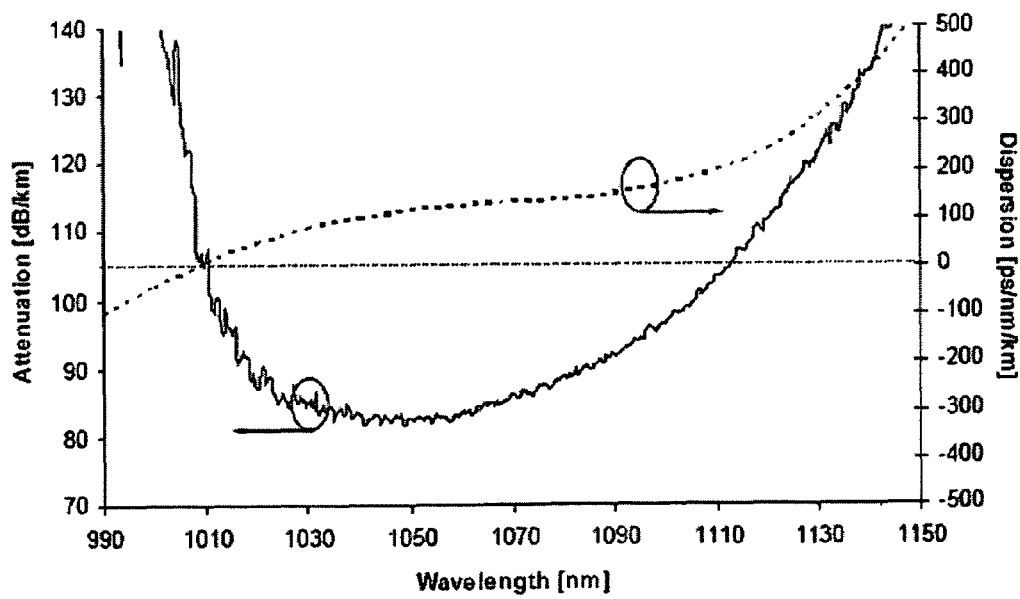
Figure 2B

AUTOMATIC DISPERSION COMPENSATION IN AMPLIFICATION FOR SHORT PULSE FIBER LASER SYSTEM

This Formal Application claims a Priority Date of Aug. 29, 2005 benefited from a Provisional Patent Applications 60/713,650, 60/713,653, and 60/713,654 and a Priority Date of Sep. 1, 2005 benefited from Provisional Applications 60/714,468 and 60/714,570 filed Sep. 7, 2005 by one of the same Applicants of this Application.

FIELD OF THE INVENTION

The present invention relates generally to apparatuses and methods for providing fiber laser system. More particularly, this invention relates a design for automatic dispersion compensation in the amplification chain implemented in a Chirped Pulse Amplification (CPA) fiber laser system.

BACKGROUND OF THE INVENTION

Even though current technologies of fiber laser have made significant progress toward achieving a compact and reliable fiber laser system providing high quality output laser with ever increasing output energy, however those of ordinary skill in the art are still confronted with technical limitations and difficulties. Specifically, in a fiber laser system implemented with the Chirped Pulse Amplification (CPA) for short pulse high power laser amplifier, the CPA systems are still limited by the technical difficulties that the third order dispersion (TOD) limits the scalability of the laser systems. Such limitations were not addressed in the conventional technologies due to the fact that the conventional solid-state laser utilizes Grating-Lens combination and Treacy compressor for pulse stretching and compressing. Ideally, in such solid-state systems, all orders of dispersion can be compensated, but the material dispersion can distort and damage this ideal situation. But the material dispersion is not a serious problem in solid-state laser system because the material dispersion is generally considered as not important. However, for a fiber laser system, the situation is different due to the fact that in the fiber laser systems, attempts are made by using the fiber stretcher to replace the grating-lens combination for the purpose of significantly increasing the system reliability. However, the TOD limits the ability for de-chirping when using Treacy compressor since both fiber stretcher and Treacy compressor have positive TOD even this combination can remove the second order dispersion completely. This issue of TOD dispersion makes it more difficult to develop a high-energy fiber laser amplifier with <200 fs pulse width. Actually, the technical difficulty of TOD dispersion is even more pronounced for laser system of higher energy. A laser system of higher energy requires a higher stretch ratio and that leads to a higher TOD. Therefore, for laser system of higher energy, it is even more difficult to re-compress the pulse to the original pulse width. For fiber laser running below 1.3 μm, e.g., Yb fiber laser, the conventional fiber CPA laser uses normal dispersion (grating-lens or fiber stretcher) for pulse chirping and abnormal dispersion, e.g., the grating pair or Photonic Bandgap (PBG) fiber, for pulse de-chirping. However, such systems still encounter technical difficulties in recompress the pulse width. Furthermore, the commercially available PBG fibers are too lossy, e.g., 0.1~0.2 dB/m. The splicing loss between the PBG fiber and the single mode fiber is 1 to 2 dB that may lead to a total loss as large as 10 dB when the PGB fiber is placed after the amplification chain. On the other hand, PBG fiber has a center hole, when it is spliced with silica core, the reflection from the splice will largely affect the performance of the amplification chain.

Therefore, a need still exists in the art of fiber laser design and manufacture to provide a new and improved configuration and method to provide fiber laser to compensate the dispersion generated in the laser system due to the TOD effects such that the above-discussed difficulty may be resolved.

SUMMARY OF THE PRESENT INVENTION

It is therefore an aspect of the present invention to provide a short pulse fiber laser amplification system by removing a separate de-chirping part and including an automatic dispersion compensation function as part of the amplification chain by configuring the stretcher with abnormal dispersive such that the above-discussed difficulties as that encountered in the prior art may be resolved.

Specifically, it is an aspect of the present invention that a short pulse fiber laser amplification system is implemented with a gain fiber that carries out an amplification function and simultaneously compresses the laser pulses such that a separate compressor is no longer necessary when the compression takes place inside the amplification chain.

It is another aspect of this invention that a short pulse fiber laser amplification system is implemented with amplification chain that includes gain fiber with pulse narrowing feature for compressing a laser pulse such that amplification and pulse width compressions are carried out simultaneously in the special single mode gain fiber and large mode-area gain fiber implemented for constructing the pulse stretcher and the amplification chain to achieve a laser output power in a range of 100 mW to 10 W.

It is another aspect of this invention that an isolator is placed before the pulse width stretcher to block any reflection back to the seed laser thus the system is immune to perturbations and is able to generate significantly increased laser power.

It is a further aspect of this invention that abnormal dispersion is generated during the chirping stage in a specially implemented FBG fiber instead of the normal dispersion as adopted widely in the conventional CPA laser system. This abnormal dispersion is cancelled out inside the active fiber such that the requirement of a separate compressor to carry out the de-chirping function is no longer necessary.

Briefly, in a preferred embodiment, the present invention discloses a fiber Chirped Pulse Amplification (CPA) laser system includes a fiber mode-locking oscillator for generating a laser for projecting to a fiber stretcher for stretching a pulse width of the laser wherein the stretcher further comprising a Photonic Bandgap (PBG) fiber having a lower nonlinearity and an abnormal dispersion than a solid core fiber for connecting and transmitting a laser from the stretcher to a multistage amplifier for amplifying the laser into an output laser whereby a separate compressor is not required.

In a preferred embodiment, this invention further discloses a method for configuring a fiber Chirped Pulse Amplification (CPA) laser system includes a step of generating a seed laser from fiber mode-locking oscillator for projecting to fiber stretcher for stretching a pulse width of the laser wherein the stretcher further comprising a Photonic Bandgap (PBG) fiber having a lower nonlinearity and an abnormal dispersion than a solid core fiber for connecting and transmitting a laser from the stretcher to a multistage amplifier for amplifying the laser into an output laser whereby a separate compressor is not required These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 1 is a functional block diagram for showing a fiber laser system implemented with an amplification-compression fiber of this invention.

FIG. 2A shows a cross sectional view and the interferences and scatting of light in the hollow core of a PBG fiber implemented as a stretcher of this invention.

FIG. 2B shows a diagram for illustrating the attenuation and dispersion of the PBG fiber implemented as a stretcher of this invention.

DETAILED DESCRIPTION OF THE INVENTION

Figure 2C:
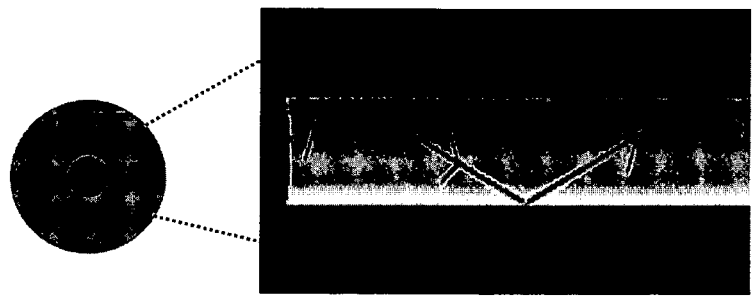
FIG. 2C shows a cross sectional view and the interferences and scatting of light in the solid core fiber implemented for interconnecting optical components in a all fiber laser system of this invention.

Referring to FIG. 1 for a schematic diagram of a fiber laser system 100 of this invention that implements a dispersion compensator of this invention. The laser system 100 includes a laser seed 105 for generating a seed laser for projecting into an isolator 110 then to a laser stretcher 115 implemented as PBG fiber to stretch the laser pulse. The stretcher 115 generates laser pulse with stretched pulse width is projected into a series of laser amplifiers 120 to amplify the laser into higher energy. These series of amplifiers 120 simultaneously carry out a pulse width compression function by compressing the laser pulses.

Figure 2D:
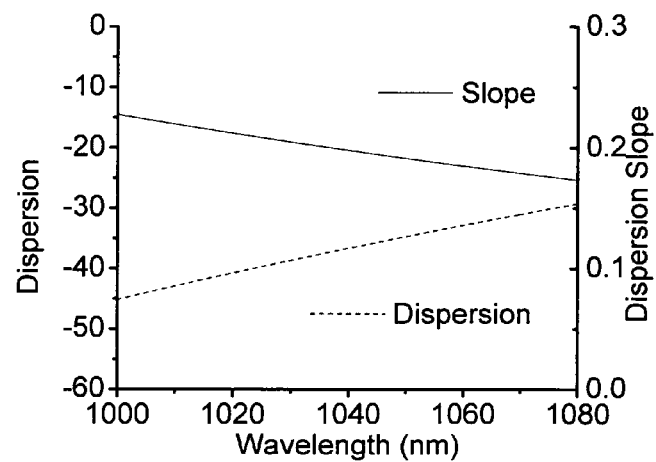
FIG. 2D shows a diagram for illustrating the attenuation and dispersion of the solid core fiber implemented for interconnecting optical components in a all fiber laser system of this invention.

The stretcher 115 is implemented with a PBG fiber and unlike the common silica core fiber, the Photonic Bandgap (PBG) fiber guides the light in a hollow core, surrounded by a micro-structured cladding formed by a periodic arrangement of air holes in silica. The special structure of the PBG fiber presents two immediate advantages. First of all, since only a small fraction of the light propagates in glass, the effect of material nonlinear characteristic is significantly reduced and the fibers do not suffer from the same limitations on loss as conventional fibers made from solid material alone. On the other hand, the light guidance in PBG fiber as shown in FIG. 2A is characterized by a light transmission transmitted through multiple interferences and Bragg scattering in the PBG fiber. The dispersion feature is totally different from the conventional silica fibers where the total internal reflection guides the transmission of the light. FIG. 2A shows the structure and the light guidance in the PBG fiber. FIG. 2B shows the attenuation spectrum and the chromatic dispersion of a PBG fiber. Compared with the solid core fiber, as shown in FIGS. 2C and 2D, the PBG fiber now implemented in the stretcher 115 has a dispersion shown in FIG. 2C that has different sign for the specific wavelength range.

Although the hollow core PBG fiber can be the important candidate of the next generation ultra-low loss transmission fibers, the relative high loss under current technology only offers the application possibility in power delivery, sensors, nonlinear optics, pulse shaping and compression. Because of the PBG fiber has a low nonlinearity and abnormal dispersion, the PBG fiber is often used in a CPA laser system for pulse compression thus replacing the grating pairs previously used in the conventional system. Implementation of the PBG fiber for pulse compression thus accomplishes the purpose of compensating the normal dispersion generated from the conventional solid core fiber. In this invention, instead of using the PBG fiber for pulse compression, the transmission processes are reversed. Instead of pulse compression, the PBG fiber is implemented for pulse stretching with abnormal dispersion where the dispersions are now shown in FIG. 2B. Then the normal dispersions generated by the solid core fiber are utilized to compensate the abnormal dispersions generated by the PBG fiber. Such optical transmission processes have two particular benefits. The first benefit is the laser system has a more compact configuration because a separate compressor is no longer required. Furthermore, the output beam can be more conveniently arranged because the use of conventional solid core fiber is used for transmitting the output laser beam.

This configuration as shown in FIG. 1 reduces the seed-in signal level due to the loss introduced by the transmission loss of the PBG fiber and the coupling loss between the PBG fiber and other fibers. The problem caused by the reduced seed-in signal level and small signal amplification issues can be overcome by well-designed amplifier chain. For example, the seed laser has an output power ranging from 0.1 mW to a few mW, for a PBG fiber stretcher, the total loss could be the 5-10 dB. The input signal for the amplifier could be very weak, between −25 dBm to −10 dBm. Special design for weak signal fiber amplifier is implemented to overcome such loss. The multi-stage amplifier chain can be used to bring the final output to 10 W level. Also the inline isolator 110 after the seed provides a function to block any reflection back to the seed laser 105, therefore, the seed-in signal is actually immune to any perturbation. The reflection from the splicing can disrupt the mode-locking operation of the seed laser, or probably causes instability of seed laser operation. The implementation of an isolator 110 features another advantage when compared to the conventional design where the PBG fiber is placed after the amplifier chain for pulse compression. For the conventional design, a high power isolator is necessary to avoid the reflection perturbation since the isolation is placed after the amplifier. In the new configuration disclosed in this invention when the PBG is implemented as a PBG stretcher, a relative low power isolator is good enough for the seed protection. Furthermore, the present configuration has another advantage over that of the conventional configuration because a power drop that usually occurs after the PBG compressor of the conventional configuration can be prevented when the PBG fiber is applied as a stretcher 115 before the amplifier chain 120.

The limitations for this configuration are the actual stretching ratio and the highest peak power that is achievable by this fiber laser system. These two issues are closed interacted. In order to reduce the nonlinear effects to provide well controllable laser pulse shapes, the amplifier fiber implemented for the amplifier chain 120 must be limited to a certain length. Furthermore, in order to match the normal dispersion in the fibers inside the amplification chain 120, the length of the PBG fiber 115 functions as the pulse stretcher must also be limited to a certain length also. The limitations of the amplifier chain 120 and the stretcher 110 limit the highest attainable pulse energy. Currently the simulation analyses for the configuration as shown in FIG. 1 provides the possibility of an all fiber compact solution for <200 fs and up to ~10 W average power 250 nJ pulse energy short pulse CPA system when nonlinearity can be suppressed. However, in single mode fiber, the power cannot be too high, especially when the gain fiber is relatively long to increase the initial pulse duration. This relates to the nonlinearity evolution and soliton generation. Furthermore, it is experimentally found by F.Ilday and F.Wise, JOSAB, 15, 470 (2002) that the gain fiber length cannot exceed the soliton period by 3 times to prevent instability. This actually limits the highest obtainable energy to ~5.4 nj for 200 fs.

For a laser system that is required for a higher power scaling, a large-mode-area (LMA) fiber is required to achieve the theoretical limit. The single mode active fiber can support 200-300 mW output power according to this estimation. An LMA fiber can have 5-6 times larger core than the single mode fiber to supports a laser system to generate an average power that is 25-35 times higher. Furthermore, the recently available Large-Flatten-Mode (LFM) fiber can have 7-8 times larger core, will support 50 times higher average power; the photonic crystal active fiber can have about 10 times larger core, supports 100 times higher average power. This leads to the average power up to more than 30 W for the current design. It is much more difficult and unpractical to use PBG compressor in the high power application since it would be more difficult to couple these special fiber amplifier output into the PBG fiber. Instead, in the new design, it is not required to consider all of these issues. The transition from low power application to the high power application is quite smooth and natural.

Figure 3:
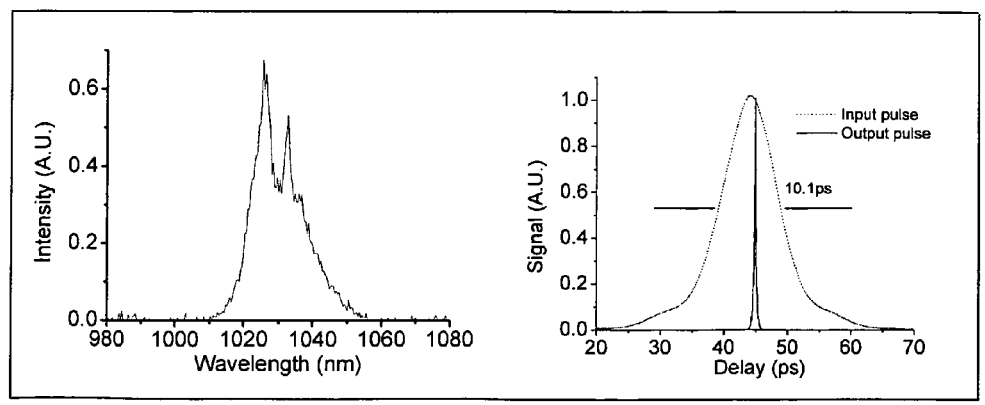
FIG. 3 shows diagrams for demonstrating the experimental results of self-dispersion compensation in fiber laser system including the spectrum and the pulse duration before and after amplification.

As a demonstration, a fiber laser system based on the configuration shown in FIG. 1 is constructed. By implementing an isolator 110 for eliminating the reflection from the PBF splicing, the output power is significantly increased. An average power of 330 mW and average power of 8 nJ single pulse energy is achieved. This setup is an all single-mode fiber device, achieves the theoretical limit for single mode active fiber. The autocorrelation of the pulse before the amplifier and the amplifier is shown in FIG. 3. The spectrum shows some structure resulting from the nonlinearity evolution.

According to above drawings and descriptions this invention discloses a fiber Chirped Pulse Amplification (CPA) laser system. The fiber CPA laser system includes a fiber mode-locking oscillator for generating a laser for projecting to a fiber stretcher for stretching a pulse width of the laser wherein the stretcher further includes a Photonic Bandgap (PBG) fiber having a lower nonlinearity and an abnormal dispersion than a solid core fiber for connecting and transmitting a laser from the stretcher to a multistage amplifier for amplifying the laser into an output laser whereby a separate compressor is not required. In a preferred embodiment, the solid core fiber further generating a normal dispersion for substantially canceling the abnormal dispersion generated in the PBG fiber. In another preferred embodiment, the Photonic Bandgap (PBG) fiber guides the light in a hollow core, surrounded by a microstructured cladding formed by a periodic arrangement of air holes in a silica. In another preferred embodiment, the Photonic Bandgap (PBG) fiber guides the light in a hollow core for reducing a material nonlinear characteristic and generating a plurality of interferences and Bragg scattering whereby the laser is transmitted with the abnormal dispersion from the PBG fiber. In another preferred embodiment, the PGB fiber guides the light in a hollow core for generating a wavelength dependent dispersion having a negative dispersion in a first wavelength range and a positive dispersion in a second wavelength range. In another preferred embodiment, the fiber CPA laser system further includes an isolator disposed between the fiber mode-locking oscillator projecting a seed laser and the pulse stretcher for isolating the fiber mode-locking oscillator from a reflection perturbation. In another preferred embodiment, the multistage amplifier includes an amplifier for weak signal amplification. In another preferred embodiment, the multistage amplifier includes an amplifier for weak signal amplification fro bringing a power level of the laser to substantially a range of 10 W to 30 W or higher. In another preferred embodiment, the CPA laser system constituting a compact laser system for generating a laser pulse less than 200 fs pulse width having a power level of substantially 10 W and average energy substantially 250 nj. In another preferred embodiment, the solid core fiber further includes large-mode-area (LMA) fiber. In another preferred embodiment, the solid core fiber further includes large-mode-area (LMA) fiber having a core approximately five to six times greater than a single mode fiber (SMF). In another preferred embodiment, the solid core fiber further includes large-flatten-mode-area (LFA) fiber having a core approximately seven to eight times greater than a single mode fiber (SMF). In another preferred embodiment, the solid core fiber further includes photonic crystal active fiber having a core approximately ten times greater than a single mode fiber (SMF). In another preferred embodiment, the solid core fiber further includes a single mode fiber and the CPA laser system constituting a compact laser system for generating a laser having a power level of substantially 330 mW and average energy substantially 8 nj.

This invention further discloses a method for configuring a fiber CPA laser system. The method includes a step of generating a seed laser from fiber mode-locking oscillator for projecting to a fiber stretcher for stretching a pulse width of the laser wherein the stretcher further includes a Photonic Bandgap (PBG) fiber having a lower nonlinearity and an abnormal dispersion than a solid core fiber for connecting and transmitting a laser from the stretcher to a multistage amplifier for amplifying the laser into an output laser whereby a separate compressor is not required.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A fiber Chirped Pulse Amplification (CPA) laser system, comprising:
   a seed laser configured to produce a first laser pulse having a first pulse width;
   a fiber-based stretcher configured to receive the first laser pulse and output a second laser pulse having a second pulse width wider than the first pulse width, wherein the fiber-based stretcher comprises a hollow core configured to guide the first laser pulse and a plurality of holes surrounding the hollow core, wherein the plurality of holes have substantially the same width; and
   a solid-core fiber component configured to simultaneously amplify and compress the second laser pulse to output a third laser pulse having a third pulse width shorter than the second pulse width, wherein the seed laser is configured to output a laser with power lower than 10 mW, wherein the solid-core fiber component is configured to output a laser with power higher than 2 W.

2. The fiber CPA laser system of claim 1, wherein the solid-core fiber component is a unitary fiber component.

3. The fiber CPA laser system of claim 1, wherein the plurality of holes surrounding the hollow core are disposed in a substantially periodic pattern.

4. The fiber CPA laser system of claim 1, wherein the seed laser is configured to output a laser with power lower than 1 mW, wherein the solid-core fiber component is configured to output a laser with power higher than 10 W.

5. The fiber CPA laser system of claim 4, wherein the solid-core fiber component comprises multiple stages of amplifiers.

6. The fiber CPA laser system of claim 1, wherein the seed laser is configured to output a laser with power lower than 1 mW, wherein the solid-core fiber component is configured to output a laser with power higher than 200 mW.

7. The fiber CPA laser system of claim 1, wherein the solid-core fiber component comprises a large-mode-area (LMA) fiber, a large-flatten-mode-area (LFA) fiber, or a photonic crystal active fiber.

8. The fiber CPA laser system of claim 7, wherein the solid-core fiber component has a core width more than four times the core width of a single mode fiber (SMF), wherein the solid-core fiber component is configured to output a laser with power higher than 5 w.

9. The fiber CPA laser system of claim 8, wherein the solid-core fiber component has a core width more than six times the core width of a SMF, wherein the solid-core fiber component is configured to output a laser with power higher than 10 W.

10. The fiber CPA laser system of claim 9, wherein the solid-core fiber component has a core width more than eight times the core width of a SMF, wherein the solid-core fiber component is configured to output a laser with power higher than 20 W.

11. The fiber CPA laser system of claim 1, wherein the laser system does not include a compressor that is separate from the solid-core fiber component and is configured to compress the second laser pulse.

12. The fiber CPA laser system of claim 1, further comprising an isolator disposed between the seed laser and the fiber-based stretcher, wherein the isolator is configured to block reflections from the fiber-based stretcher.

13. The fiber CPA laser system of claim 1, wherein the solid-core fiber component is a single mode fiber that is configured to output a laser with power higher than 200 mW, wherein the third laser pulse has energy higher than 5 nj.

14. The fiber CPA laser system of claim 1, wherein the third pulse width is shorter than 200 fs and the third laser pulse has energy higher than 50 nj.

15. A fiber Chirped Pulse Amplification (CPA) laser system, comprising:
  a seed laser configured to produce a first laser pulse having a first pulse width;
  a fiber-based stretcher configured to receive the first laser pulse and output a second laser pulse having a second pulse width wider than the first pulse width, wherein the fiber-based stretcher comprises a hollow core configured to guide the first laser pulse and a plurality of holes surrounding the hollow core, wherein the plurality of holes have substantially the same width and are disposed in a substantially periodic pattern; and
  a unitary fiber component comprising a solid core and configured to simultaneously amplify and compress the second laser pulse to output a third laser pulse having a third pulse width shorter than the second pulse width, wherein the seed laser is configured to output a laser with power lower than 10 mW, wherein the unitary fiber component is configured to output a laser with power higher than 10 W.

16. The fiber CPA laser system of claim 15, wherein the solid-core fiber component comprises multiple stages of amplifiers.

17. The fiber CPA laser system of claim 15, wherein the seed laser is configured to output a laser with power lower than 1 mW, wherein the unitary fiber component is configured to output a laser with power higher than 200 mW.

18. The fiber CPA laser system of claim 15, wherein the unitary fiber component comprises a single mode fiber that is configured to output a laser with power higher than 200 mW, wherein the third laser pulse has energy higher than 5 nj.

19. The fiber CPA laser system of claim 15, wherein the third pulse width is shorter than 200 fs and the third laser pulse has energy higher than 50 nj.

20. The fiber CPA laser system of claim 15, wherein the unitary fiber component comprises a large-mode-area (LMA) fiber, a large-flatten-mode-area (LEA) fiber, or a photonic crystal active fiber.

21. The fiber CPA laser system of claim 20, wherein the unitary fiber component has a core width more than four times the core width of a single mode fiber (SMF), wherein the unitary fiber component is configured to output a laser with power higher than 5 w.

22. A fiber Chirped Pulse Amplification (CPA) laser system, compnsing:
  a seed laser configured to produce a first laser pulse having a first pulse width and to output a laser with power lower than 10 mW;
  a fiber-based stretcher configured to receive the first laser pulse and output a second laser pulse having a second pulse width wider than the first pulse width, wherein the fiber-based stretcher comprises a hollow core configured to guide the first laser pulse and a plurality of holes surrounding the hollow core, wherein the plurality of holes have substantially the same width and are disposed in a substantially periodic pattern; and
  a unitary fiber component comprising a solid core and configured to simultaneously amplify and compress the second laser pulse to output a third laser pulse having a third pulse width shorter than 200 fs and shorter than the second pulse width, wherein the third laser pulse has energy higher than 50 nj, and wherein the unitary fiber component is configured to output a laser with power higher than 10 W.

* * * * *